United States Patent
Mojumder et al.

(10) Patent No.: US 9,660,649 B2
(45) Date of Patent: May 23, 2017

(54) VOLTAGE SCALING FOR HOLISTIC ENERGY MANAGEMENT

(71) Applicant: QUALCOMM Incorporated, San Diego, CA (US)

(72) Inventors: Niladri Narayan Mojumder, San Diego, CA (US); Stanley Seungchul Song, San Diego, CA (US); Kern Rim, San Diego, CA (US); Choh Fei Yeap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 14/639,755

(22) Filed: Mar. 5, 2015

(65) Prior Publication Data

US 2016/0142054 A1     May 19, 2016

Related U.S. Application Data

(60) Provisional application No. 62/080,824, filed on Nov. 17, 2014.

(51) Int. Cl.
*H03L 5/00*     (2006.01)
*H03K 19/00*    (2006.01)
(Continued)

(52) U.S. Cl.
CPC ....... *H03K 19/0016* (2013.01); *G06F 1/3206* (2013.01); *G06F 1/3212* (2013.01);
(Continued)

(58) Field of Classification Search
CPC ................... H03K 19/0016; H03K 19/018507
(Continued)

(56) References Cited

U.S. PATENT DOCUMENTS 6,373,226 B1 *   4/2002   Itou ................. H02J 7/0018
                                                  320/132
7,525,373 B1     4/2009   Ogilvie et al.
(Continued)

FOREIGN PATENT DOCUMENTS

JP           20135101 A  *  7/2013

OTHER PUBLICATIONS

Gonzalez, R. et al., "Supply and Threshold Voltage Scaling for Low Power CMOS," IEEE Journal of Solid-State Circuits, Aug. 1997, vol. 32, No. 8, IEEE, Piscataway, NJ, pp. 1210-1216.
(Continued)

*Primary Examiner* — Dinh T Le
(74) *Attorney, Agent, or Firm* — Toler Law Group, PC.

(57) ABSTRACT

A method for scaling voltages provided to different modules of a system-on-chip (SOC) includes receiving, at an energy-performance engine of the SOC, a first indication of usage history for a first module of the SOC and a second indication of usage history for a second module of the SOC. The method includes receiving a battery life indication that indicates a remaining battery life for a battery of the SOC. The method also includes adjusting a first supply voltage provided to the first module of the SOC based on the first indication, the second indication, and the battery life indication. The method further includes adjusting a second supply voltage provided to the second module of the SOC based on the first indication, the second indication, and the battery life indication.

30 Claims, 8 Drawing Sheets

(51) Int. Cl.
    *H03K 19/0185*     (2006.01)
    *G06F 1/32*     (2006.01)
    *G06F 17/50*     (2006.01)

(52) U.S. Cl.
    CPC ... *G06F 1/3296* (2013.01); *H03K 19/018507* (2013.01); *G06F 17/505* (2013.01); *G06F 2209/5019* (2013.01); *G06F 2217/68* (2013.01); *G06F 2217/78* (2013.01); *Y02B 60/1285* (2013.01); *Y02B 60/1292* (2013.01)

(58) Field of Classification Search
    USPC ........ 327/540–544, 306, 333; 730/300, 340; 713/300, 340; 702/60, 63
    See application file for complete search history.

(56) References Cited

U.S. PATENT DOCUMENTS

| | | | |
|---|---|---|---|
| 7,657,438 B2* | 2/2010 | Obayashi | B60K 6/46 180/65.21 |
| 8,200,371 B2 | 6/2012 | Weyland | |
| 8,694,811 B2 | 4/2014 | Raju et al. | |
| 2004/0039954 A1 | 2/2004 | White et al. | |
| 2008/0301474 A1 | 12/2008 | Bussa et al. | |
| 2011/0204852 A1* | 8/2011 | Saruhashi | H01M 10/441 320/134 |
| 2012/0210325 A1* | 8/2012 | de Lind van Wijngaarden | H04W 52/0258 718/103 |
| 2013/0007413 A1 | 1/2013 | Thomson et al. | |
| 2014/0189377 A1 | 7/2014 | Subbareddy et al. | |
| 2014/0191794 A1 | 7/2014 | Krishnappa et al. | |
| 2014/0232188 A1 | 8/2014 | Cheriyan et al. | |

OTHER PUBLICATIONS

International Search Report and Written Opinion for International Application No. PCT/US2015/057367, ISA/EPO, Date of Mailing Dec. 17, 2015, 16 pages.

* cited by examiner

| | Operating Frequency | Execution Time |
|---|---|---|
| First Module | 1.45 GHz | 4 Hours |
| | 1.92 GHz | 2 Hours |
| | 2.25 GHz | 1 Hour |
| | 2.5 GHz | 0.5 Hours |
| Second Module | 800 MHz | 8 Hours |
| Third Module | 450 MHz | 18 Hours |

204

VOLTAGE SCALING FOR HOLISTIC ENERGY MANAGEMENT

I. CLAIM OF PRIORITY

The present application claims priority from U.S. Provisional Patent Application No. 62/080,824, entitled "VOLTAGE SCALING FOR HOLISTIC ENERGY MANAGEMENT," filed Nov. 17, 2014, the contents of which are incorporated by reference in their entirety.

II. FIELD

The present disclosure is generally related to energy management.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), tablet computers, and paging devices that are small, lightweight, and easily carried by users. Many such computing devices include other devices that are incorporated therein. For example, a wireless telephone can also include a digital still camera, a digital video camera, a digital recorder, and an audio file player. Also, such computing devices can process executable instructions, including software applications, such as a web browser application that can be used to access the Internet and multimedia applications that utilize a still or video camera and provide multimedia playback functionality.

A wireless device may include a system-on-chip (SOC) that integrates multiple components, modules, and/or processors. As a non-limiting example, the SOC may include a central processing unit (CPU), a graphics processing unit (GPU), a digital signal processor (DSP), a modulator/demodulator (modem), a display module, etc. The usage time for each component of the SOC may vary based on an individual user experience. For example, a user may perform a relatively large number of functions on the wireless device that utilize the CPU and may perform a relatively small number of functions that utilize the GPU. Providing the same supply voltage to the CPU and to the GPU may result in unnecessary power consumption. For example, the GPU may consume power (based on the supply voltage) when the wireless device is not using the GPU.

IV. SUMMARY

Techniques for dynamically scaling voltages supplied to different modules of a system-on-chip (SOC) of a wireless device are disclosed. For example, the SOC may include a battery, a usage history module, a mode control, and a plurality of voltage domains. Each voltage domain may include a processing unit. For example, a first voltage domain may include a central processing unit (CPU), a second voltage domain may include a graphics processing unit (GPU), a third voltage domain may include a digital signal processor (DSP), etc.

The mode control may receive monitored data from the battery, the usage history module, and each voltage domain. For example, the battery may include a monitor that indicates a remaining battery life and that provides data (indicating the remaining battery life) to the mode control. The usage history module may monitor historical data associated with the usage of each voltage domain. For example, the usage history module may monitor how frequently the first voltage domain has been used relative to how frequently the second and third voltage domains have been used. The usage history module may provide data indicating the usage history to the mode control. Each voltage domain may monitor a received supply voltage from a voltage regulator and may provide data (indicating the received supply voltage) to the mode control.

Based on the received monitored data, the mode control may provide a signal to the voltage regulator that enables the voltage regulator to adjust the supply voltages provided to each voltage domain. For example, the mode control may determine whether to increase or decrease a supply voltage provided to particular voltage domain based on the received monitored data. The determination may be based on the remaining battery life and the usage history. For example, if the remaining battery life is relatively low and the usage history indicates that the first voltage domain has historically been used more frequently than the second and third voltage domains, the voltage regulator may increase the supply voltage provided to the first voltage domain and decrease the supply voltages provided to the second and third voltage domains. Thus, the SOC may dynamically adjust (e.g., scale) the supply voltages provided to each voltage domain based on historical data indicating a usage history, to reduce power consumption.

In a particular aspect, a method for scaling voltages provided to different modules of a system-on-chip (SOC) includes receiving, at an energy-performance engine of the SOC, a first indication of usage history for a first module of the SOC and a second indication of usage history for a second module of the SOC. The method includes receiving a battery life indication that indicates a remaining battery life for a battery of the SOC. The method includes adjusting a first supply voltage provided to the first module of the SOC based on the first indication, the second indication, and the battery life indication. The method further includes adjusting a second supply voltage provided to the second module of the SOC based on the first indication, the second indication, and the battery life indication.

In another particular aspect, an apparatus includes an energy-performance engine of a system-on-chip (SOC) and a memory storing instructions executable by the energy-performance engine to perform operations. The operations include receiving a first indication of usage history for a first module of the SOC and a second indication of usage history for a second module of the SOC. The operations also include receiving a battery life indication that indicates a remaining battery life for a battery of the SOC. The operations further include adjusting a first supply voltage provided to the first module of the SOC based on the first indication, the second indication, and the battery life indication. The operations also include adjusting a second supply voltage provided to the second module of the SOC based on the first indication, the second indication, and the battery life indication.

In another particular aspect, a non-transitory computer-readable medium includes instructions for scaling voltages provided to different modules of a system-on-chip (SOC). The instructions, when executed by an energy-performance engine of the SOC, cause the energy-performance engine to receive a first indication of usage history for a first module of the SOC and a second indication of usage history for a second module of the SOC. The instructions are also executable to cause the energy-performance engine to receive a battery life indication that indicates a remaining battery life for a battery of the SOC. The instructions are also executable to cause the energy-performance engine to adjust a first supply voltage provided to the first module of the SOC based on the first indication, the second indication, and the battery life indication. The instructions are further executable to cause the energy-performance engine to adjust a second supply voltage provided to the second module of the SOC based on the first indication, the second indication, and the battery life indication.

In another particular aspect, an apparatus includes means for generating a first indication of usage history for a first module of a system-on-chip (SOC) and a second indication of usage history for a second module of the SOC. The apparatus also includes means for generating a battery life indication that indicates a remaining battery life for a battery of the SOC. The apparatus further includes means for adjusting a first supply voltage and a second supply voltage. The first supply voltage is provided to the first module of the SOC based on the first indication, the second indication, and the battery life indication. The second supply voltage is provided to the second module of the SOC based on the first indication, the second indication, and the battery life indication.

One particular advantage provided by at least one of the disclosed embodiments is an ability to adjust (e.g., scale) supply voltages provided to different components of a system-on-chip (SOC). Reducing (e.g., adjusting) the supply voltage provided to a particular component that historically is less frequently used than other components may reduce power consumption. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
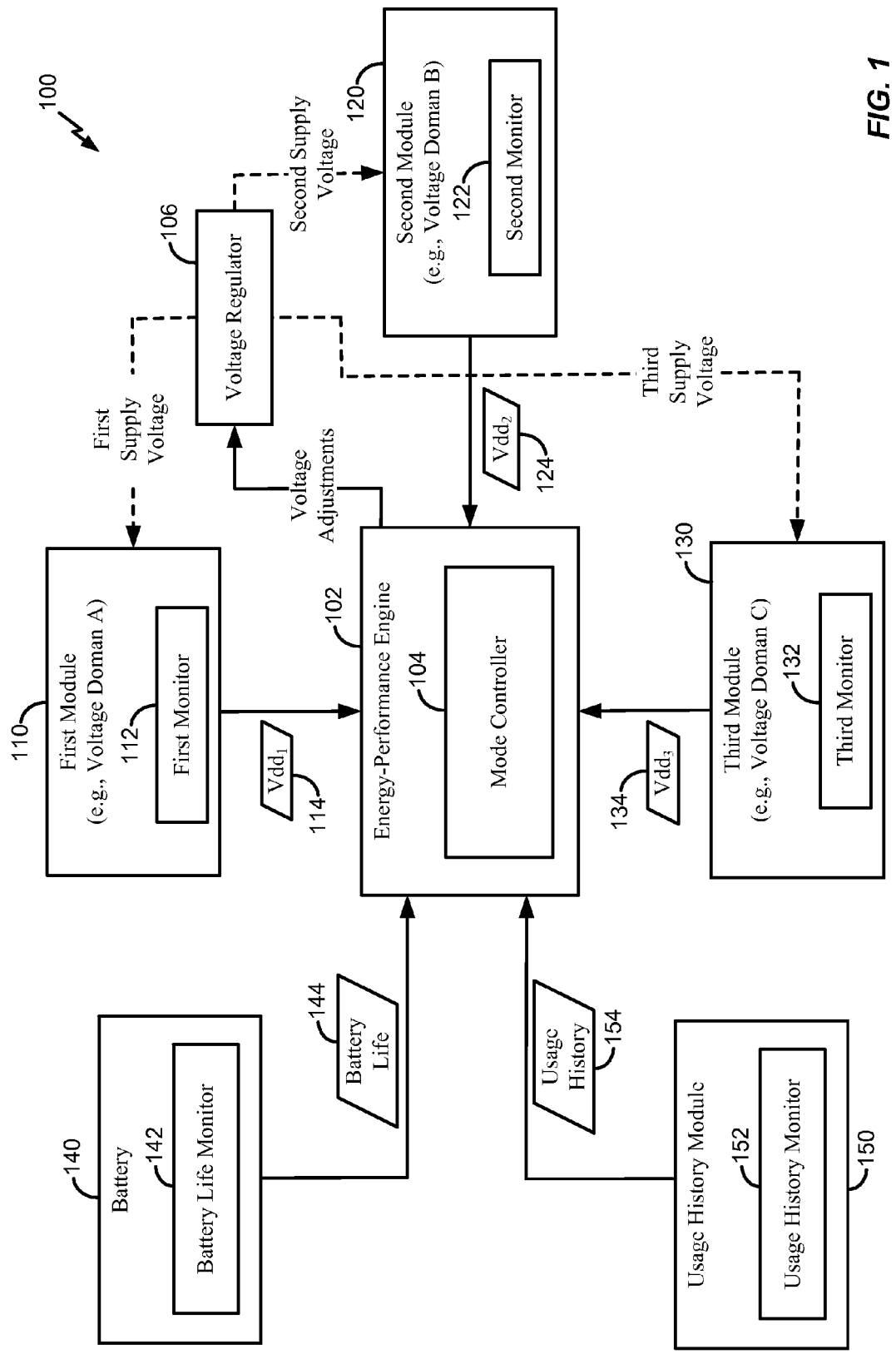
FIG. 1 is a diagram of a particular illustrative embodiment of a system-on-chip (SOC) that is operable to dynamically scale voltages supplied to different modules.

Referring to FIG. 1, a particular illustrative embodiment of a system-on-chip (SOC) 100 that is operable to dynamically scale voltages supplied to different modules is shown. The SOC 100 includes an energy-performance engine 102, a voltage regulator 106, a first module 110, a second module 120, a third module 130, a battery 140, and a usage history module 150. The energy-performance engine 102 may be a processor that is configured to manage voltages provided to the modules 110, 120, 130. In a particular embodiment, the SOC 100 may be integrated into a wireless device. For example, the SOC 100 may be integrated into a mobile phone, a communications device, a personal digital assistant (PDA), a tablet, a navigation device, a music player, a video player, or an entertainment unit.

Each module 110, 120, 130 may correspond to a processing unit of the SOC 100. As a non-limiting example, the first module 110 may include a central processing unit (CPU), the second module 120 may include a graphics processing unit (GPU), and the third module 130 may include a digital signal processor (DSP). Although three modules 110, 120, 130 are depicted in the SOC 100, in other embodiments, the SOC 100 may include additional (or fewer) modules. For example, the SOC 100 may also include a modulator/demodulator (MODEM), a display module, etc.

The first module 110 may correspond to a first voltage domain (e.g., "Voltage Domain A") and may receive a first supply voltage from the voltage regulator 106. The first supply voltage may be based on a configured (e.g., "optimum") supply voltage for the first module 110 that is determined during a design phase based on a predicted user experience, as described in greater detail with respect to FIG. 2. The first module 110 may include a first monitor 112. The first monitor 112 may be configured to monitor the received supply voltage (e.g., the first supply voltage) and to provide a first supply voltage indication ($Vdd_1$) 114 to a mode controller 104 of the energy-performance engine 102. For example, the first supply voltage indication 114 may indicate the voltage level of the first supply voltage.

Figure 2:
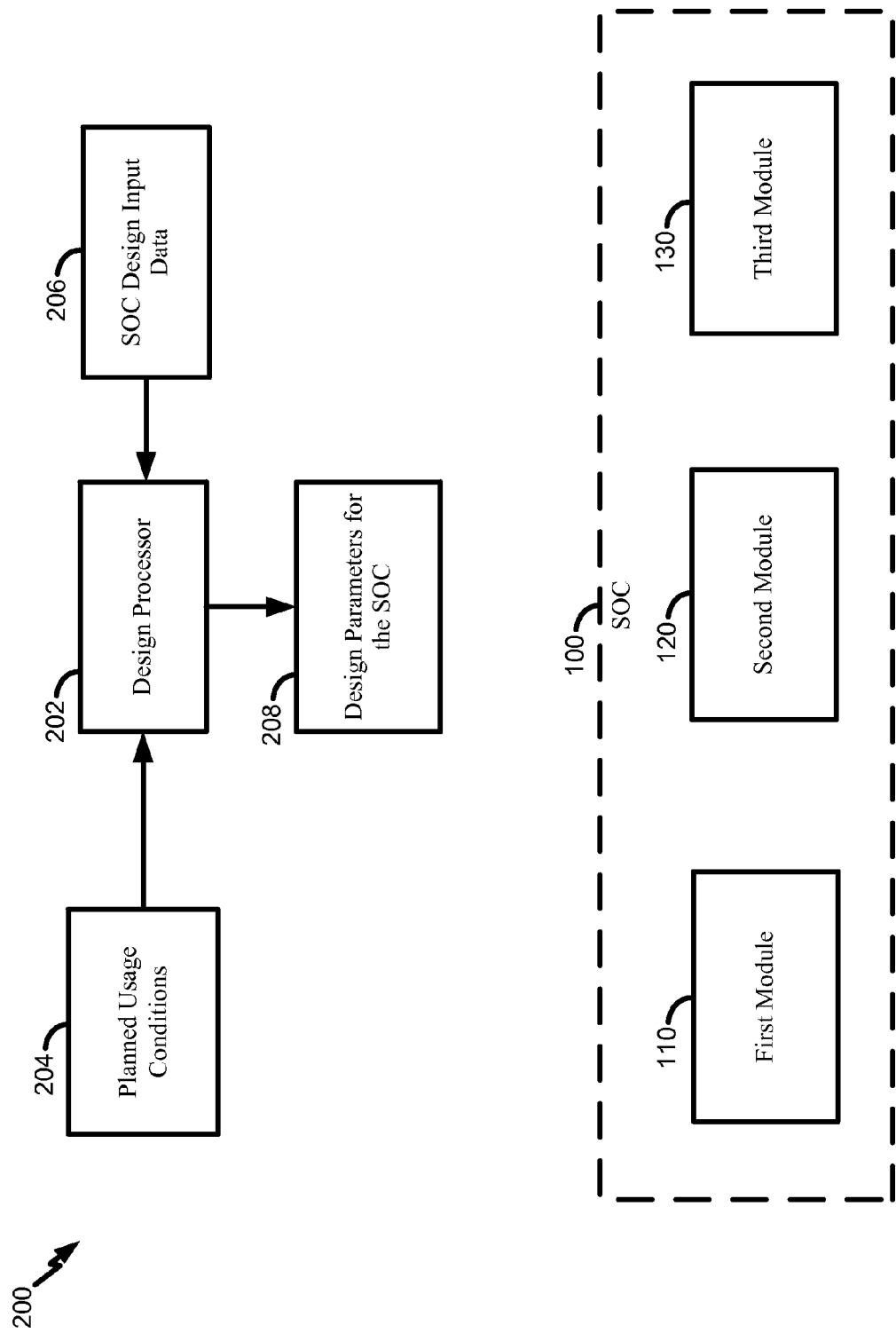
FIG. 2 is a diagram of a particular illustrative embodiment of a system that is operable to determine design parameters for the SOC of FIG. 1.

Additionally, during the design phase, threshold voltages and channel lengths of transistors in the first module 110 are configured (e.g., "optimized") based on a planned (or "predicted") user experience, as described in greater detail with respect to FIG. 2. The energy-performance engine 102 may store information indicating the threshold voltages and channel lengths of transistors in the first module 110.

The second module 120 may correspond to a second voltage domain (e.g., "Voltage Domain B") and may receive a second supply voltage from the voltage regulator 106. The second supply voltage may be based on a configured (e.g., "optimum") supply voltage for the second module 120 that is determined during the design phase based on the predicted user experience, as described in greater detail with respect to FIG. 2. The second module 120 may include a second monitor 122. The second monitor 122 may be configured to monitor the received supply voltage (e.g., the second supply voltage) and to provide a second supply voltage indication ($Vdd_2$) 124 to the mode controller 104 of the energy-performance engine 102. For example, the second supply voltage indication 124 may indicate the voltage level of the second supply voltage.

Additionally, during the design phase, threshold voltages and channel lengths of transistors in the second module 120 are configured (e.g., "optimized") based on the planned user experience, as described in greater detail with respect to FIG. 2. The energy-performance engine 102 may store information indicating the threshold voltages and channel lengths of transistors in the second module 120.

The third module 130 may correspond to a third voltage domain (e.g., "Voltage Domain C") and may receive a third supply voltage from the voltage regulator 106. The third supply voltage may be based on a configured (e.g., "optimum") supply voltage for the third module 130 that is determined during the design phase based on the predicted user experience, as described in greater detail with respect to FIG. 2. The third module 130 may include a third monitor 132. The third monitor 132 may be configured to monitor the received supply voltage (e.g., the third supply voltage) and to provide a third supply voltage indication (Vdd$_3$) 134 to the mode controller 104 of the energy-performance engine 102. For example, the third supply voltage indication 134 may indicate the voltage level of the third supply voltage.

Additionally, during the design phase, threshold voltages and channel lengths of transistors in the third module 130 are configured (e.g., "optimized") based on the planned user experience, as described in greater detail with respect to FIG. 2. The energy-performance engine 102 may store information indicating the threshold voltages and channel lengths of transistors in the third module 130.

The battery 140 may be coupled to the energy-performance engine 102. The battery 140 may include a battery life monitor 142 configured to monitor a remaining battery life of the battery 140. For example, the battery life monitor 142 may determine approximately how much longer the battery 140 is able to power the other components of the SOC 100. The battery life monitor 142 may generate a battery life indication 144 indicating the remaining battery life of the battery 140 and may provide the battery life indication 144 to the mode controller 104 of the energy-performance engine 102.

The usage history module 150 may also be coupled to the energy-performance engine 102. The usage history module 150 may include a usage history monitor 152 configured to monitor historical data associated with the usage of the first module 110, the second module 120, and the third module 130. For example, the usage history monitor 152 may monitor how frequently the first module 110 has been used relative to how frequently the second and third modules 120, 130 have been used. In a particular embodiment, the usage history monitor 152 may receive indications of the usage history from an external monitor (not shown) coupled to the modules 110, 120, 130. In another particular embodiment, the usage history module 150 may be coupled to the other modules 110, 120, 130 to enable the usage history monitor 152 to monitor the usage history.

The frequency of use for each module 110, 120, 130 may be based on a user experience. For example, if a user has historically used the wireless device (that includes the SOC 100) primarily for phone calls, emails, texting, and social media purposes, the third module 130 (e.g., the DSP) may be used more than the first and second modules 110, 120. If the user has historically used the wireless device primarily for games and music, the first module 110 (e.g., the CPU) may be used more than the second and third modules 120, 130.

The usage history monitor 152 may generate a usage history indication 154. The usage history indication 154 may include a first indication of usage history for the first module 110, a second indication of the usage history for the second module 120, and a third indication of usage history for the third module 130. The first indication of usage history may indicate how frequently the wireless device performs applications that utilize the first module 110 and/or time periods that the first module 110 has historically been used. The second indication of usage history may indicate how frequently the wireless device performs applications that utilize the second module 120 and/or time periods that the second module 120 has historically been used. The third indication of usage history may indicate how frequently the wireless device performs applications that utilize the third module 130 and/or time periods that the third module 130 has historically been used. The usage history indication 154 may be provided to the mode controller 104 of the energy-performance engine 102.

The mode controller 104 may receive the monitored data (e.g., the first supply voltage indication 114, the second supply voltage indication 124, the third supply voltage indication 134, the battery life indication 144, and the usage history indication 154). Based on the received monitored data, the mode controller 104 may determine a mode to operate the SOC 100. For example, the mode controller 104 may determine whether to adjust (e.g., scale) the supply voltages provided to the modules 110, 120, 130 to increase the battery life of the battery 140.

For example, if the remaining battery life (indicated by the battery life indication 144) is below a particular threshold, the mode controller 104 may determine whether the supply voltages provided to the modules 110, 120, 130 should be adjusted to extend the battery life. The particular threshold for the remaining battery life may be measured as a unit of time. As a non-limiting example, the particular threshold for the remaining battery life may be approximately equal to forty-five minutes. Thus, when the remaining battery life is below forty-five minutes, the mode controller 104 may determine whether the supply voltages provided to the modules 110, 120, 130 should be adjusted to extend the battery life. The determination may be based on the usage history (indicated by the usage history indication 154). For example, if the remaining battery life is relatively low (e.g., below the threshold) and the usage history indicates that the first module 110 has historically been used more frequently than the second and third modules 120, 130, the mode controller 104 may provide a voltage adjustment signal to voltage regulator 106 to increase the first supply voltage and to decrease the second and third supply voltages. Thus, the less frequently used modules 120, 130 may receive lower supply voltages and may consume less power, which may extend the remaining battery life.

The determination of how to adjust the supply voltage provided to the modules 110, 120, 130 may be further based on time periods that each module 110, 120, 130 has historically been used. For example, if the remaining battery life is relatively low, the mode controller 104 may determine the time of day and may determine which module has been historically been used at the time (based on the usage history indication 154). As a non-limiting example, if the time of day is 8:15 pm and the usage history indication 154 indicates that historically the third module 130 is used more than the other modules 110, 120 between 8:00 pm and 10:00 pm, the mode controller 104 may provide a voltage adjustment signal to the voltage regulator 106 to increase the third supply voltage and to decrease the first and second supply voltages (even if the first module 110 is historically used more frequently than the third module 130 over the course of twenty-four hours).

In a particular aspect, the mode controller 104 may determine a use of operation for each module 110, 120, 130 and a power draw associated with the use of operation. The voltage adjustment signal generated by the mode controller 104 may further be based on the power draw associated with the use of operation of each module 110, 120, 130. As a non-limiting example, the third module 130 may perform a first operation (e.g., a write operation) and a second operation (e.g., a read operation), and the second module may perform a third operation (e.g., a read operation) and a fourth operation (e.g., a write operation). The first operation may draw more power than the third operation, but the second operation may draw less power than the fourth operation. Although the third module 130 may be historically used more frequently than the second module 120 between 8:00 pm and 10:00 pm, the mode controller 104 may provide a voltage adjustment signal to the voltage regulator 106 to increase the second supply voltage and to decrease the first and third supply voltage if the third module 130 infrequently performs write operations between 8:00 pm and 10:00 pm and the second module 120 frequently performs write operations between 8:00 pm and 10:00 pm.

The voltage adjustments provided to the voltage regulator 106 by the energy-performance engine 102 may further be based on the threshold voltages and channel lengths of transistors in each module 110, 120, 130. The energy-performance engine 102 may determine the amount to adjust each supply voltage provided to each module 110, 120, 130 to reduce leakage (and thus reduce power consumption) based on the threshold voltages and channel lengths of the transistors. For example, the energy-performance engine 102 may configure (e.g., "optimize") the supply voltages provided to each module 110, 120, 130 based on transistor characteristics of the respective module 110, 120, 130. To illustrate, the energy-performance engine 102 may determine the amount to increase (or decrease) the first supply voltage based on the threshold voltages of transistors in the first module 110. As a non-limiting example, if the transistors in the first module 110 have a relatively large threshold voltage, the energy-performance engine 102 may increase the first supply voltage by a relatively large amount.

The SOC 100 of FIG. 1 may adjust (e.g., scale) supply voltages provided to the different modules 110, 120, 130 to increase the battery life of the battery 140. For example, the energy-performance engine 102 may signal the voltage regulator 106 to lower the supply voltages provided to one or more modules 110, 120, 130 that historically are used infrequently. Reducing (e.g., adjusting) the supply voltage provided to a particular module that historically is less frequently used than other modules may reduce power consumption. For example, a module that is less likely to be used may receive a decreased supply voltage to conserve battery life.

Referring to FIG. 2, a particular illustrative embodiment of a system 200 that is operable to determine design parameters for the SOC 100 of FIG. 1 is shown. For example, the system 200 includes design processor 202 (e.g., a design engine) that is configured to determine design parameters 208 for the SOC 100 during the design phase of the SOC 100.

In the illustrative embodiment, the design processor 202 may be a transistor design engine and/or a supply voltage design engine. For example, the design processor 202 may determine design parameters 208 for transistors that are to be implemented in the SOC 100. As non-limiting examples, the design parameters 208 may specify threshold voltages for transistors that are to be implemented in each module 110, 120, 130 of the SOC 100, gate lengths for transistors that are to be implemented in each module 110, 120, 130 of the SOC 100, on/off currents for transistors that are to be implemented in each module 110, 120, 130 of the SOC 100, supply voltages to be provided to each module 110, 120, 130 of the SOC, other parameters, or any combination thereof. In a particular embodiment, transistors in the first module 110 may have different characteristics (e.g., threshold voltages, channel lengths, on/off currents, etc.) than transistors in the other modules 120, 130. Additionally, each module 110, 120, 130 may be provided with different supply voltages. As described below, the design parameters 208 may increase energy efficiency for the wireless device based on a planned user experience.

To determine the design parameters 208, the design processor 202 may receive planned usage conditions 204 for the SOC 100 and other SOC design input data 206. The other SOC design input data 206 is described in greater detail with respect to FIG. 5. The planned usage conditions 204 for the SOC 100 may indicate the amount of time that each module 110, 120, 130 in the SOC 100 is predicted to operate at certain operating frequencies during a battery life of the wireless device.

Figure 3:
FIG. 3 is a diagram of a particular illustrative embodiment of a table illustrating planned usage conditions.

Referring to FIG. 3, a particular embodiment of a table illustrating the planned usage conditions 204 is shown. For example, the planned usage conditions 204 may indicate that the first module 110 of the SOC 100 is to operate at approximately 1.45 Gigahertz (GHz) for four hours during a single battery life of the wireless device (e.g., an amount of time that the wireless device operates if the battery is fully charged). The planned usage conditions 204 further indicate that the first module 110 of the SOC 100 is to operate at approximately 1.92 GHz for two hours during the single battery life of the wireless device. The planned usage conditions 204 also indicate that the first module 110 of the SOC 100 is operate at approximately 2.25 GHz for one hour during the single battery life of the wireless device. Additionally, the planned usage conditions 204 indicate that the first module 110 of the SOC 100 is to operate at 2.5 GHz for half an hour during the single battery life of the wireless device.

The planned usage conditions 204 indicate that the second module 120 of the SOC 100 is to operate at 800 Megahertz (MHz) for eight hours during the single battery life of the wireless device. The planned usage conditions 204 also indicate that the third module 130 of the SOC 100 is to operate at 450 MHz for eighteen hours during the single battery life of the wireless device.

The operating frequency and execution time for the module 110, 120, 130 in the planned usage conditions 204 may be based on a predicted user experience (e.g., based on a user profile). For example, a first user profile may correspond to a wireless device user that will use the wireless device primarily for communications purposes (e.g., texting, phone calls, emails, etc.), and a second user profile may correspond to a wireless device user that will use the wireless device primarily for music and gaming purposes.

Figure 4:
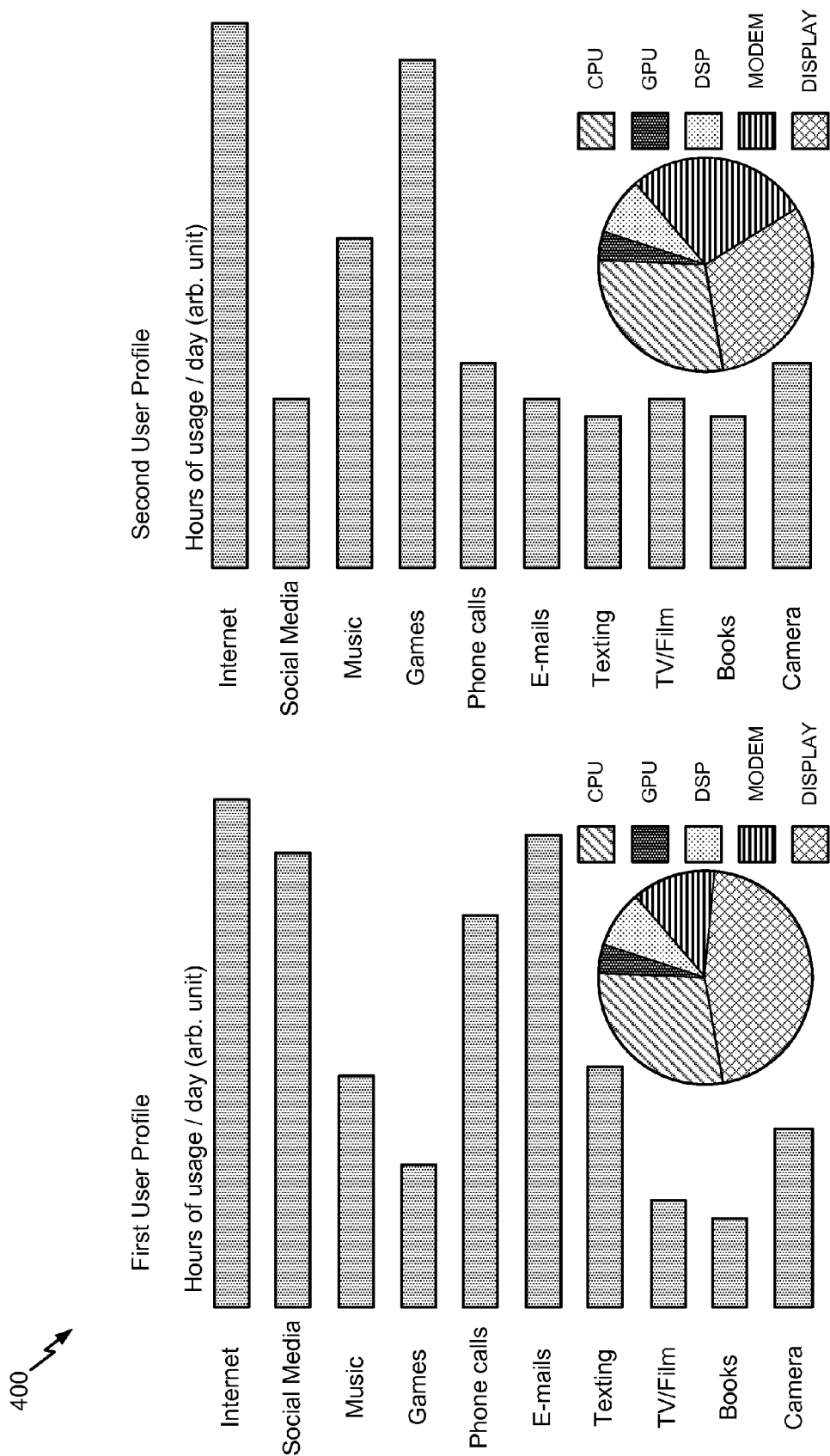
FIG. 4 is a diagram of a particular illustrative embodiment of a first user profile and a second user profile.

To illustrate, referring to FIG. 4, a particular illustrative embodiment 400 of a first user profile and a second user profile is shown. The first user profile indicates that the first user will primarily use the wireless device for phone calls, emails, texting, and social media purposes. The second user profile indicates that the second user will primarily use the wireless device for games and music. Based on the user profile, the operating frequency and usage time (e.g., run time) in the CPU, GPU, DSP, and MODEM may change for an SOC. For example, the second user may use the CPU for a greater amount of time than the first user uses the CPU (e.g., music and gaming requires more CPU usage than texting and phone calls).

Thus, referring back to FIG. 2, the planned usage conditions 204 provided to the design processor 202 may be based on a predicted user experience (e.g., the first user profile of FIG. 4 or the second user profile of FIG. 4). If the planned usage conditions 204 are based on the first user profile, the design parameters 208 (e.g., the transistor parameters and the supply voltage parameters) may be configured (e.g., "optimized") to design an SOC 100 used primarily for phone calls, emails, texting, and social media purposes. If the planned usage conditions 204 are based on the second user profile, the design parameters 208 may be configured (e.g., "optimized") to design an SOC 100 used primarily for games and music. Design parameters 208 based on the first user profile may be used to design a first version of a wireless device, and design parameters 208 based on the second user profile may be used to design a second version of the wireless device. Each version of the wireless device may include similar components/modules (e.g., each version may correspond to a similar model of the wireless device).

As used herein, configuring (e.g., "optimizing") the design parameters 208 corresponds to determining transistor threshold voltages, transistor channel lengths, transistor on/off currents, and supply voltages, or any combination thereof, for each module 110, 120, 130, that will improve performance (e.g., increase energy efficiency) of the SOC 100 based on the predicted user experience. For example, increasing the transistor threshold voltages of transistors in a CPU to speed up the CPU may lead to increased battery energy drain. If the CPU runs for a relatively small fraction of time (as in the case of the first user profile), the battery energy drain caused by increasing the transistor threshold voltages may be a poor tradeoff for the increased CPU speed. Thus, the design parameters 108 for the first user profile may indicate to design transistors having relatively small transistor threshold voltages for the CPU because the CPU is predicted to run for a relatively small fraction of time.

The system 200 of FIG. 2 may increase energy efficiency of the SOC 100 based on a predicted user experience. For example, by providing the planned usage conditions 204 to the design processor 202, the design processor 202 may determine design parameters 208 (e.g., transistor parameters and the supply voltage parameters) for the SOC 100 based on how long a user is likely to use a particular module 110, 120, 130 within the SOC 100 at a particular frequency. For example, the design processor 202 may generate the design parameters 208 based on first usage conditions (e.g., a first operating frequency of the CPU and the amount of time the CPU operates at the first operating frequency) and based on second usage conditions (e.g., a second operating frequency of the DSP and the amount of time the DSP operates at the second operating frequency). Generating the design parameters 208 based on the planned usage conditions 204 (e.g., the first usage conditions and the second usage conditions) may enable the design of different versions of a wireless device to improve performance (e.g., increase energy efficiency) based on an anticipated planned user experience.

Figure 5:
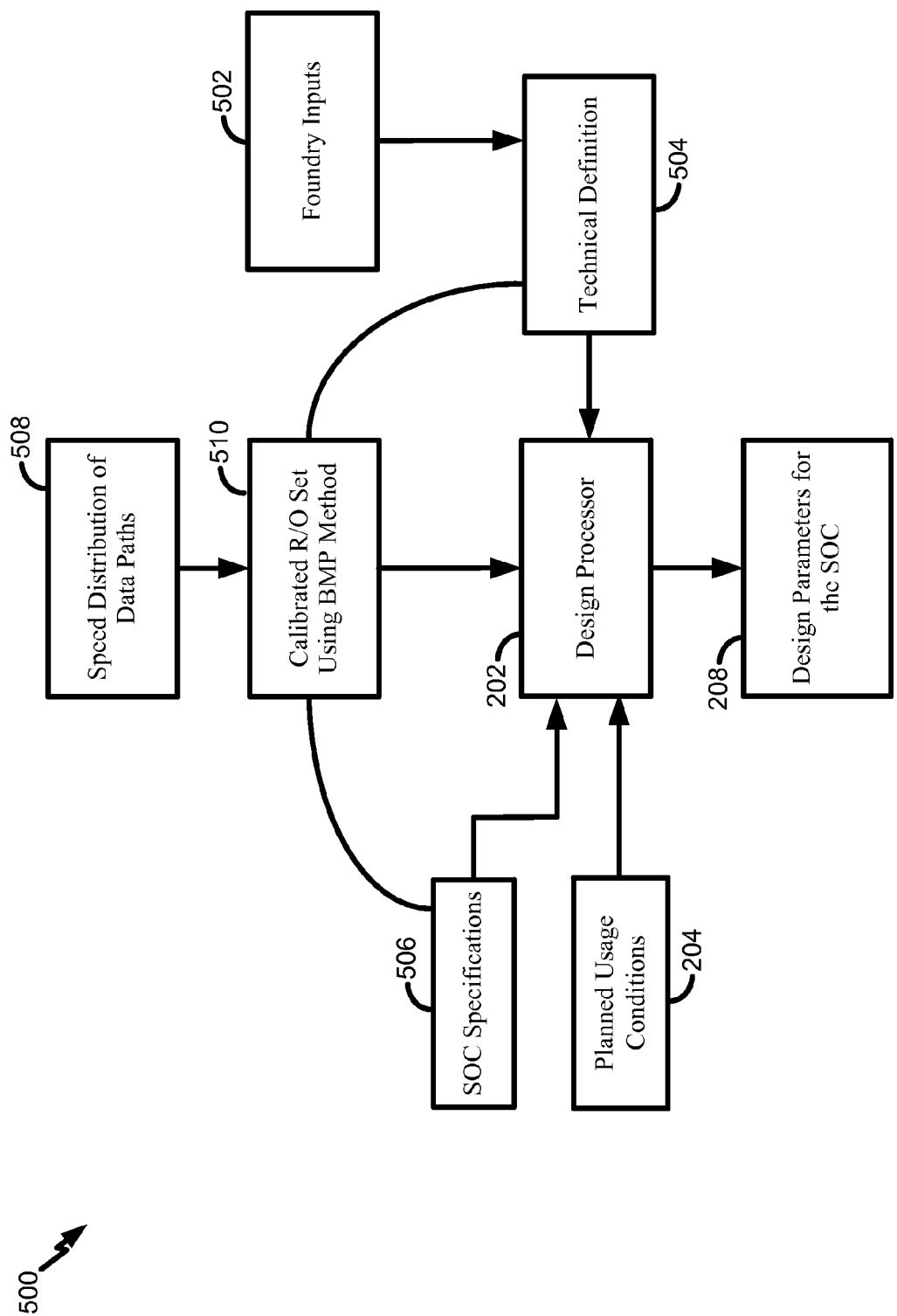
FIG. 5 is a diagram of another particular illustrative embodiment of a system that is operable to determine design parameters for the SOC of FIG. 1.

Referring to FIG. 5, a particular illustrative embodiment of a system 500 that is operable to determine design parameters for a SOC for a wireless device is shown. The system 500 includes the design processor 202 of FIG. 2 that is configured to determine the design parameters 208 of the SOC 100 based on the planned usage conditions 204. The design processor 202 may also determine the design parameters 208 based on foundry inputs 502, a technical definition 504, specifications 506, a speed distribution 508 of data paths, and a calibrated ring oscillator (R/O) set 510 that is binned and mapped by path (BMP), as described below. In a particular embodiment, the foundry inputs 502, the technical definition 504, the specifications 506, the speed distribution 508, and the calibrated R/O set 510 may correspond to the other SOC design input data 206 of FIG. 2.

The foundry inputs 502 and the technical definition 504 may determine possible technologies (e.g., 20 nm designs, silicon-germanium (SiGe) designs, etc.) for the threshold voltages and gate lengths, on and off currents, and other parameters to design the overall SOC. In addition, the specifications 506, such as speed, power requirements, and other parameters, define the overall possibilities for the SOC design.

The system 500 considers the data paths that run through the SOC and divides the data paths (e.g., or a representative sample of the data paths) by the length of time taken to traverse the data paths. The speed distribution 508 of the data paths for the SOC, along with the specifications 506 and the technical definitions 504, are inputs to a set of devices. These devices (e.g., ring oscillators, logic gates, or other like devices) are binned and mapped by path (BMP) for a selected threshold voltage and gate length, at 510.

Once the power and/or speed for the data paths in the SOC are calibrated to a given part (e.g., ring oscillator, logic gate, etc.) and the planned usage conditions 204 are provided to the design processor 202 (as described with respect to FIGS. 2-4), the design processor 202 determines which transistors, and/or which data paths, within the SOC may use different threshold voltages, gate lengths, transistor on/off currents, and other parameters and outputs a higher-performance SOC design as the design parameters 208 for the SOC 100.

The system 500 of FIG. 5 may improve performance (e.g., increase energy efficiency) of the SOC 100 based on a predicted user experience. For example, by providing the planned usage conditions 204 to the design processor 202, the design processor 202 may determine design parameters 108 (e.g., transistor parameters and supply voltage parameters) for each module 110, 120, 130 of the SOC 100 based on how long a user is likely to use a particular module 110, 120, 130 within the SOC 100 at a particular frequency. For example, the design processor 202 may generate the design parameters 208 based on first usage conditions (e.g., a first operating frequency of the CPU and the amount of time the CPU operates at the first operating frequency) and based on second usage conditions (e.g., a second operating frequency of the DSP and the amount of time the DSP operates at the second operating frequency). Generating the design parameters 208 based on the planned usage conditions 204 (e.g., the first usage conditions and the second usage conditions) may enable the design of different versions of a wireless device to increase energy efficiency based on an anticipated planned user experience.

Figure 6:
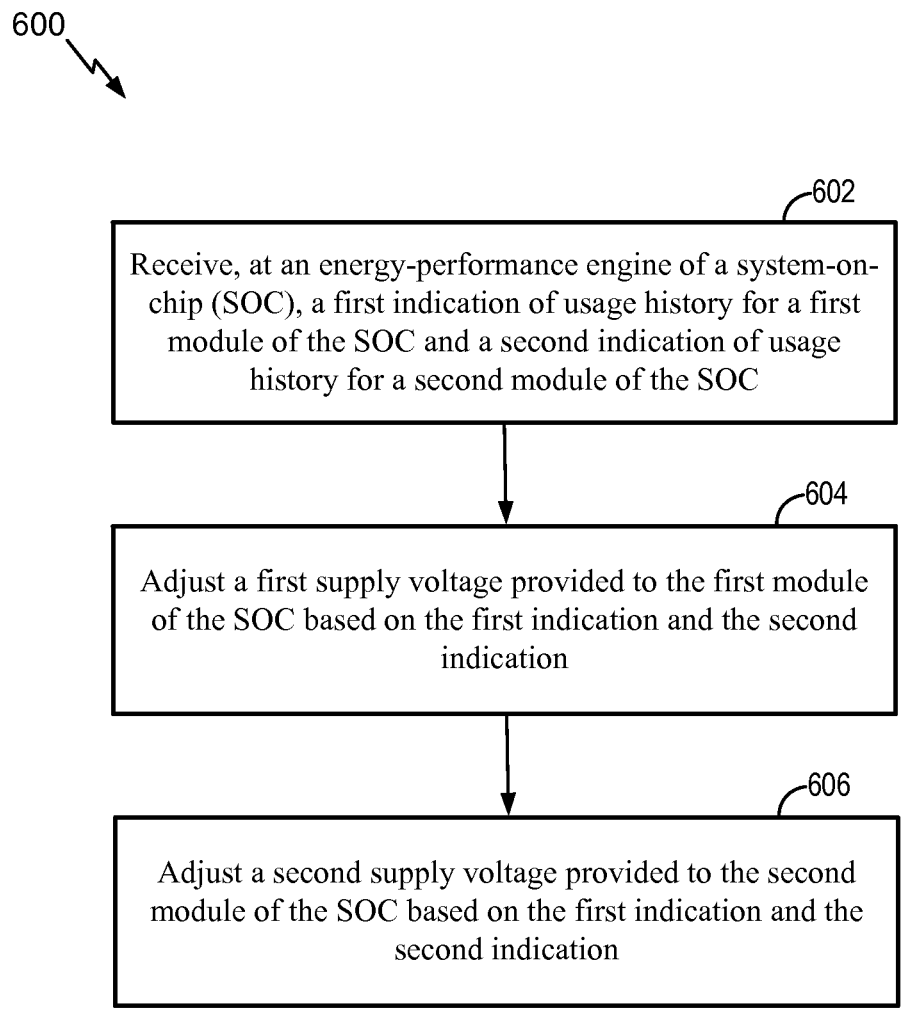
FIG. 6 is a flow chart of a particular illustrative embodiment of a method for dynamically scaling voltages provided to different voltage domains of a SOC.

Referring to FIG. 6, a flowchart of a particular illustrative embodiment of a method 600 for determining design parameters for a SOC for a wireless device is shown. The method 600 may be performed using components of the SOC 100 of FIG. 1.

The method 600 includes receiving, at an energy-performance engine of a SOC, a first indication of usage history for a first module of the SOC and a second indication of usage history for a second module of the SOC, at 602. For example, referring to FIG. 1, the mode controller 104 of the energy-performance engine 102 may receive the usage history indication 154. The usage history indication 154 may include a first indication of usage history for the first module 110, a second indication of the usage history for the second module 120, and a third indication of usage history for the third module 130. The first indication of usage history may indicate how frequently the wireless device performs applications that utilize the first module 110 and/or time periods that the first module 110 has historically been used. The second indication of usage history may indicate how frequently the wireless device performs applications that utilize the second module 120 and/or time periods that the second module 120 has historically been used. The third indication of usage history may indicate how frequently the wireless device performs applications that utilize the third module 130 and/or time periods that the third module 130 has historically been used. The usage history indication 154 may be provided to the mode controller 104 of the energy-performance engine 102. In a particular embodiment, the usage history monitor 152 may receive indications of the usage history from an external monitor (not shown) coupled to the modules 110, 120, 130. In another particular embodiment, the usage history module 150 may be coupled to the other modules 110, 120, 130 to enable the usage history monitor 152 to monitor the usage history.

A first supply voltage provided to the first module of the SOC may be adjusted based on the first indication and the second indication, at 604. As a non-limiting example, referring to FIG. 2, if the remaining battery life of the battery 140 is relatively low (e.g., below a threshold) and the usage history indicates that the first module 110 has historically been used more frequently than the second module 120, the mode controller 104 may provide a voltage adjustment signal to the voltage regulator 106 to increase the first supply voltage provided to the first module 110.

A second supply voltage provided to the second module of the SOC may be adjusted based on the first indication and the second indication. As a non-limiting example, referring to FIG. 2, if the remaining battery life of the battery 140 is relatively low (e.g., below the threshold) and the usage history indicates that the first module 110 has historically been used more frequently than the second module 120, the mode controller 104 may provide a voltage adjustment signal to the voltage regulator 106 to decrease the second supply voltage provided to the second module 120.

The method 600 of FIG. 6 may adjust (e.g., scale) supply voltages provided to the different modules 110, 120 to increase the battery life of the battery 140. For example, the energy-performance engine 102 may signal the voltage regulator 106 to lower the supply voltages provided to one or more modules that historically are used infrequently. Reducing (e.g., adjusting) the supply voltage provided to a particular module that historically is less frequently used than other modules may reduce power consumption. For example, a module that is less likely to be used may receive a lower supply voltage to conserve battery life.

Figure 7:
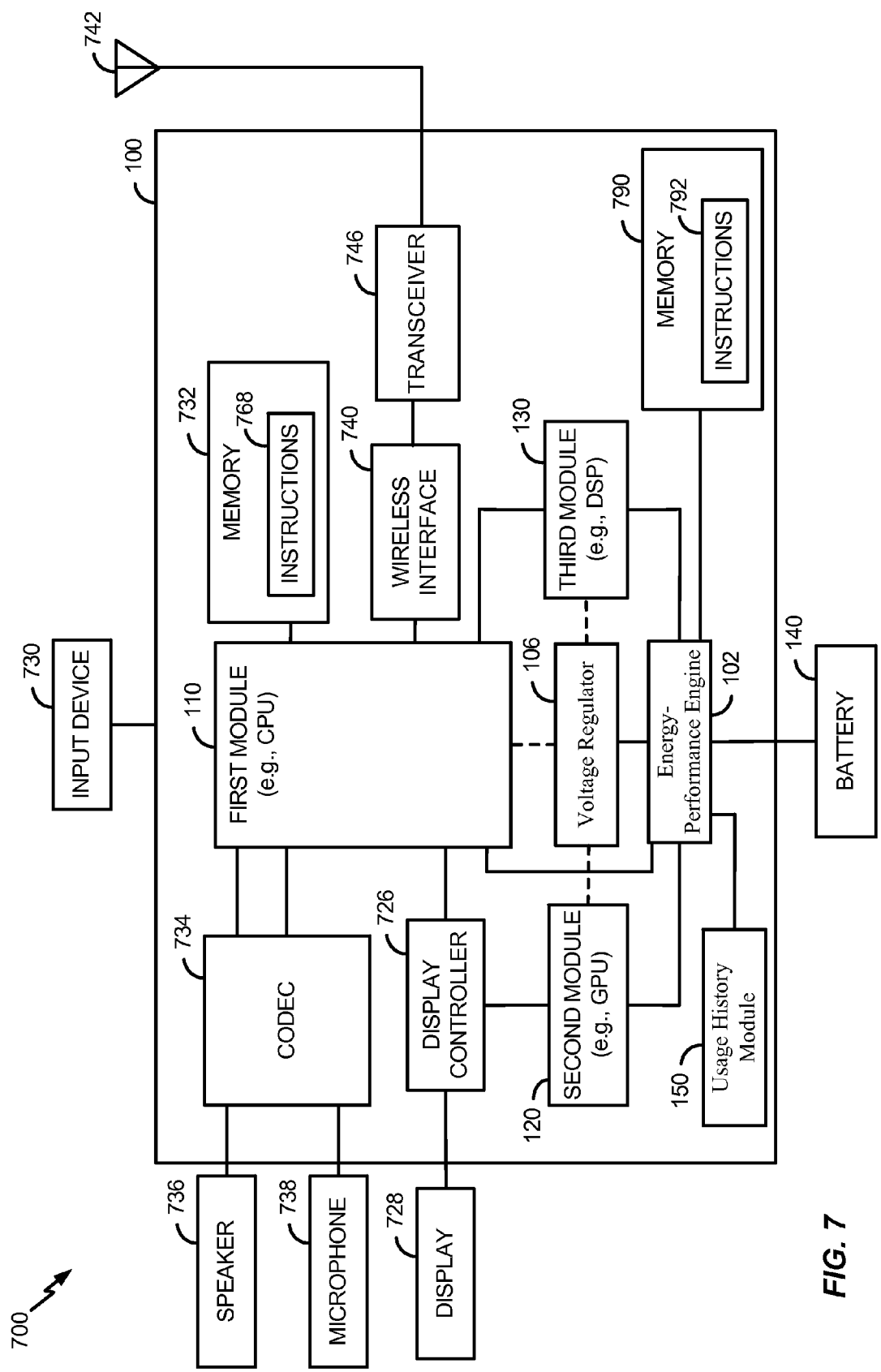
FIG. 7 is a block diagram of a device that includes an SOC that is operable to dynamically scale voltages supplied to different modules.

Referring to FIG. 7, a particular illustrative embodiment of a wireless communication device is depicted and generally designated 700. The device 700 includes the first module 110 (e.g., a CPU) coupled to a memory 732. The circuitry (e.g., the transistors) within the first module 110 may be designed according to the design parameters 208 determined by the design processor 202. The first module 110 may be configured to execute software (e.g., a program of one or more instructions 768) stored in the memory 732.

A wireless interface 740 can be coupled to the first module 110 and to an antenna 742 via a transceiver 746. A coder/decoder (CODEC) 734 can also be coupled to the first module 110. A speaker 736 and a microphone 738 can be coupled to the CODEC 734. A display controller 726 can be coupled to the first module 110 and to a display device 728. The second module 120 (e.g., a GPU) may be coupled to the display controller 726. The circuitry within the second module 120 may be designed according to the design parameters 208 determined by the design processor 202. Additionally, the third module 130 (e.g., a DSP) may be coupled to the first module 110. The circuitry within the third module 130 may be designed according to the design parameters 208 determined by the design processor 202.

The energy-performance engine 102 may be coupled to a memory 790 storing instructions 792. The memory 790 may be a non-transitory computer-readable medium. The instructions 790 may be executable to cause the energy-performance engine 102 to perform the method 600 of FIG. 6. For example, the usage history module 150 and the battery 140 may be coupled to the energy-performance engine 102. Additionally, the first, second, and third modules 110, 120, 130 may be coupled to the energy-performance engine 102. The first module 110 may provide the first supply voltage indication 114 of FIG. 1 to the energy-performance engine 102, the second module 120 may provide the second supply voltage indication 124 of FIG. 1 to the energy-performance engine 102, and the third module 130 may provide the third supply voltage indication 134 of FIG. 1 to the energy-performance engine 102. Additionally, the battery 140 may provide the battery life indication 144 of FIG. 1 to the energy-performance engine 102, and the usage history module 150 may provide the usage history indication 154 of FIG. 1 to the energy-performance engine 102.

Based on the remaining battery life of the battery 140, the energy-performance engine 102 may signal the voltage regulator 106 to adjust the supply voltages provided to the first, second, and third modules 110, 120, 130 in a substantially similar manner as described with respect to FIG. 1. For example, the voltage adjustments may be based on historical usage data indicated by the usage history module 150.

In a particular embodiment, the energy-performance engine 102, the voltage regulator 106, the first module 110, the second module 120, the third module 130, the usage history module 150, the display controller 726, the memory 732, the CODEC 734, the wireless interface 740, the transceiver 746, and the memory 790 are included in a system-in-package or SOC device. For example, the energy-performance engine 102, the voltage regulator 106, the first module 110, the second module 120, the third module 130, the usage history module 150, the display controller 726, the memory 732, the CODEC 734, the wireless interface 740, the transceiver 746, and the memory 790 may be included in the SOC 100 of FIG. 1.

In a particular embodiment, an input device 730 and the battery 140 are coupled to the SOC 100. In an alternative embodiment, the battery 140 may be included in the SOC 100. Moreover, in a particular embodiment, as illustrated in FIG. 7, the display device 728, the input device 730, the speaker 736, the microphone 738, the antenna 742, and the battery 140 are external to the SOC 100. However, each of the display device 728, the input device 730, the speaker 736, the microphone 738, the antenna 742, and the battery 140 can be coupled to one or more components of the SOC 100, such as one or more interfaces or controllers.

Figure 8:
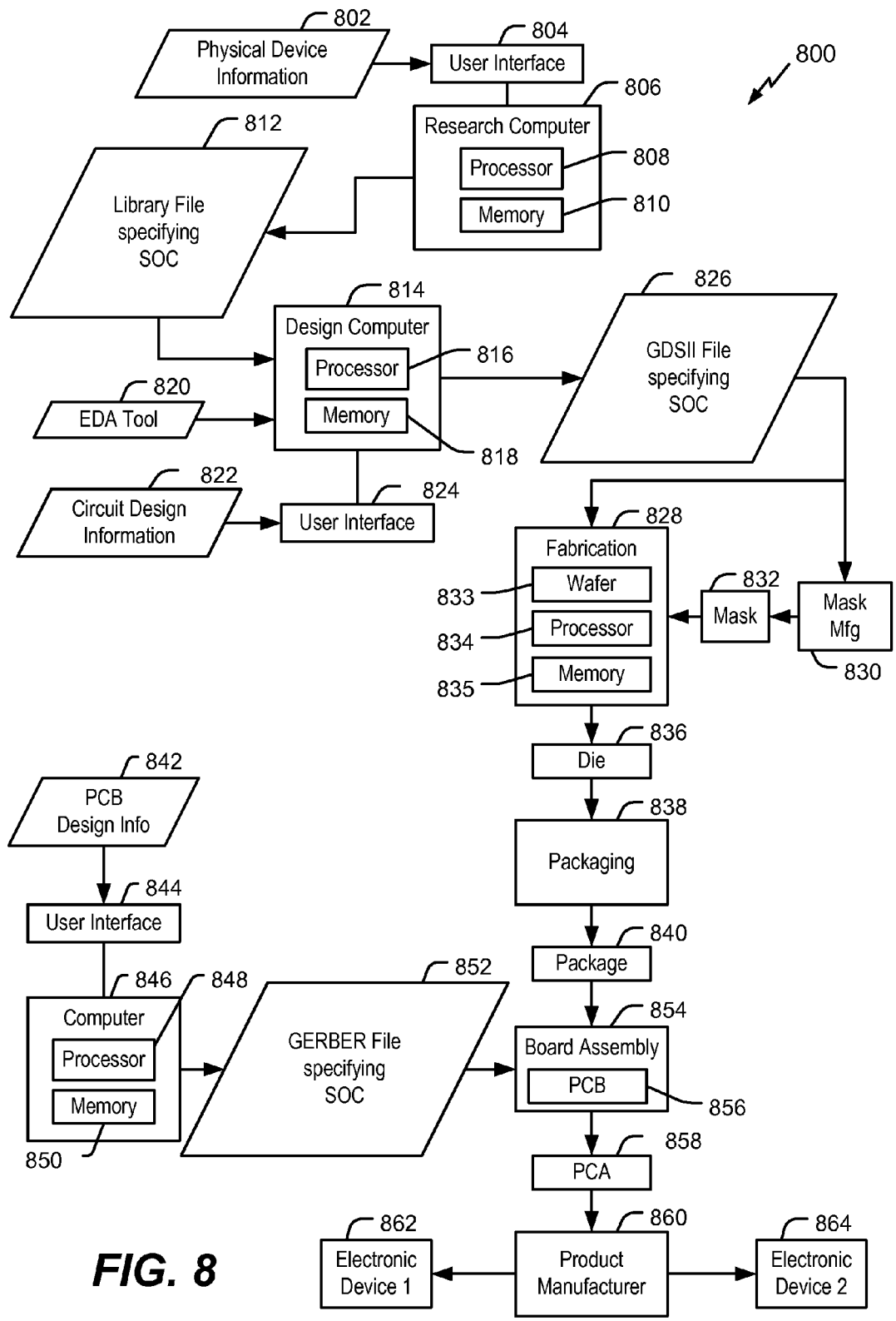
FIG. 8 is a data flow diagram of a particular illustrative embodiment of a manufacturing process to manufacture an SOC that is operable to dynamically scale voltages supplied to different modules.

The foregoing disclosed devices and functionalities may be designed and configured into computer files (e.g., RTL, GDSII, GERBER, etc.) stored on computer-readable media. Some or all such files may be provided to fabrication handlers to fabricate devices based on such files. Resulting products include wafers that are then cut into dies and packaged into chips. The chips are then employed in devices described above. FIG. 8 depicts a particular illustrative embodiment of an electronic device manufacturing process 800.

Physical device information 802 is received at the manufacturing process 800, such as at a research computer 806. The physical device information 802 may include design information representing at least one physical property of a semiconductor device, such as a physical property of the SOC 100. For example, the physical device information 802 may include physical parameters, material characteristics, and structure information that is entered via a user interface 804 coupled to the research computer 806. The research computer 806 includes a processor 808, such as one or more processing cores, coupled to a computer-readable medium such as a memory 810. The memory 810 may store computer-readable instructions that are executable to cause the processor 808 to transform the physical device information 802 to comply with a file format and to generate a library file 812.

In a particular embodiment, the library file 812 includes at least one data file including the transformed design information. For example, the library file 812 may include a library of semiconductor devices, including the SOC 100, provided for use with an electronic design automation (EDA) tool 820.

The library file 812 may be used in conjunction with the EDA tool 820 at a design computer 814 including a processor 816, such as one or more processing cores, coupled to a memory 818. The EDA tool 820 may be stored as processor executable instructions at the memory 818 to enable a user of the design computer 814 to design a circuit including the SOC 100, using the library file 812. For example, a user of the design computer 814 may enter circuit design information 822 via a user interface 824 coupled to the design computer 814. The circuit design information 822 may include design information representing at least one physical property of a semiconductor device, such as the SOC 100. To illustrate, the circuit design property may include identification of particular circuits and relationships to other elements in a circuit design, positioning information, feature size information, interconnection information, or other information representing a physical property of an electronic device.

The design computer 814 may be configured to transform the design information, including the circuit design information 822, to comply with a file format. To illustrate, the file formation may include a database binary file format representing planar geometric shapes, text labels, and other information about a circuit layout in a hierarchical format, such as a Graphic Data System (GDSII) file format. The design computer 814 may be configured to generate a data file including the transformed design information, such as a GDSII file 826 that includes information describing the SOC 100, in addition to other circuits or information. To illustrate, the data file may include information corresponding to the SOC 100.

The GDSII file 826 may be received at a fabrication process 828 to manufacture the SOC 100 according to transformed information in the GDSII file 826. For example, a device manufacture process may include providing the GDSII file 826 to a mask manufacturer 830 to create one or more masks, such as masks to be used with photolithography processing, illustrated in FIG. 8 as a representative mask 832. The mask 832 may be used during the fabrication process to generate one or more wafers 833, which may be tested and separated into dies, such as a representative die 836. The die 836 includes a circuit including the SOC 100.

In a particular embodiment, the fabrication process 828 may be initiated by or controlled by a processor 834. The processor 834 may access a memory 835 that includes executable instructions such as computer-readable instructions or processor-readable instructions. The executable instructions may include one or more instructions that are executable by a computer, such as the processor 834.

The fabrication process 828 may be implemented by a fabrication system that is fully automated or partially automated. For example, the fabrication process 828 may be automated and may perform processing steps according to a schedule. The fabrication system may include fabrication equipment (e.g., processing tools) to perform one or more operations to form an electronic device.

The fabrication system may have a distributed architecture (e.g., a hierarchy). For example, the fabrication system may include one or more processors, such as the processor 834, one or more memories, such as the memory 835, and/or controllers that are distributed according to the distributed architecture. The distributed architecture may include a high-level processor that controls or initiates operations of one or more low-level systems. For example, a high-level portion of the fabrication process 828 may include one or more processors, such as the processor 834, and the low-level systems may each include or may be controlled by one or more corresponding controllers. A particular controller of a particular low-level system may receive one or more instructions (e.g., commands) from a high-level system, may issue sub-commands to subordinate modules or process tools, and may communicate status data back to the high-level system. Each of the one or more low-level systems may be associated with one or more corresponding pieces of fabrication equipment (e.g., processing tools). In a particular embodiment, the fabrication system may include multiple processors that are distributed in the fabrication system. For example, a controller of a low-level system component of the fabrication system may include a processor, such as the processor 834.

Alternatively, the processor 834 may be a part of a high-level system, subsystem, or component of the fabrication system. In another embodiment, the processor 834 includes distributed processing at various levels and components of a fabrication system.

The die 836 may be provided to a packaging process 838 where the die 836 is incorporated into a representative package 840. For example, the package 840 may include the single die 836 or multiple dies, such as a system-in-package (SiP) arrangement. The package 840 may be configured to conform to one or more standards or specifications, such as Joint Electron Device Engineering Council (JEDEC) standards.

Information regarding the package 840 may be distributed to various product designers, such as via a component library stored at a computer 846. The computer 846 may include a processor 848, such as one or more processing cores, coupled to a memory 850. A printed circuit board (PCB) tool may be stored as processor executable instructions at the memory 850 to process PCB design information 842 received from a user of the computer 846 via a user interface 844. The PCB design information 842 may include physical positioning information of a packaged electronic device on a circuit board, the packaged electronic device corresponding to the package 840 including the SOC 100.

The computer 846 may be configured to transform the PCB design information 842 to generate a data file, such as a GERBER file 852 with data that includes physical positioning information of a packaged electronic device on a circuit board, as well as layout of electrical connections such as traces and vias, where the packaged electronic device corresponds to the package 840 including the SOC 100. In other embodiments, the data file generated by the transformed PCB design information may have a format other than a GERBER format.

The GERBER file 852 may be received at a board assembly process 854 and used to create PCBs, such as a representative PCB 856, manufactured in accordance with the design information stored within the GERBER file 852. For example, the GERBER file 852 may be uploaded to one or more machines to perform various steps of a PCB production process. The PCB 856 may be populated with electronic components including the package 840 to form a representative printed circuit assembly (PCA) 858.

The PCA 858 may be received at a product manufacturer 860 and integrated into one or more electronic devices, such as a first representative electronic device 862 and a second representative electronic device 864. As an illustrative, non-limiting example, the first representative electronic device 862, the second representative electronic device 864, or both, may be selected from a mobile phone, a communications device, a personal digital assistant (PDA), a tablet, a navigation device, a music player, a video player, or an entertainment unit, a fixed location data unit, and a computer, into which the SOC 100, is integrated. As another illustrative, non-limiting example, one or more of the electronic devices 862 and 864 may be remote units such as mobile phones, hand-held personal communication systems (PCS) units, portable data units such as personal data assistants, global positioning system (GPS) enabled devices, or any other device that stores or retrieves data or computer instructions, or any combination thereof. Although FIG. 8 illustrates remote units according to teachings of the disclosure, the disclosure is not limited to these illustrated units. Embodiments of the disclosure may be suitably employed in any device which includes active integrated circuitry including memory and on-chip circuitry.

A device that includes the SOC 100 may be fabricated, processed, and incorporated into an electronic device, as described in the illustrative manufacturing process 800. One or more aspects of the embodiments disclosed with respect to FIGS. 1-7 may be included at various processing stages, such as within the library file 812, the GDSII file 826, and the GERBER file 852, as well as stored at the memory 810 of the research computer 806, the memory 818 of the design computer 814, the memory 850 of the computer 846, the memory of one or more other computers or processors (not shown) used at the various stages, such as at the board assembly process 854, and also incorporated into one or more other physical embodiments such as the mask 832, the die 836, the package 840, the PCA 858, other products such as prototype circuits or devices (not shown), or any combination thereof. The process 800 of FIG. 8 may be performed by a single entity or by one or more entities performing various stages of the manufacturing process 800.

In conjunction with the described aspects, an apparatus includes means for generating a first indication of usage history for a first module of a SOC and a second indication of usage history for a second module of the SOC. For example, the means for generating the first indication and the second indication may include the usage history module 150 of FIGS. 1 and 7, the usage history monitor 152 of FIG. 1, one or more other devices, circuits, modules, or any combination thereof.

The apparatus also means for generating a battery life indication that indicates a remaining battery life for a battery of the SOC. For example, the means for generating the battery life indication may include the battery life monitor 142 of FIG. 1, one or more other devices, circuits, modules, or any combination thereof.

The apparatus also include means for adjusting a first supply voltage and a second supply voltage. The first supply voltage may be provided to the first module of the SOC based on the first indication, the second indication, and the battery life indication. The second supply voltage may be provided to the second module of the SOC based on the first indication, the second indication, and the battery life indication. For example, the means for adjusting the first supply voltage and the second supply voltage may include the energy-performance engine 102 of FIGS. 1 and 7, the mode controller 104 of FIG. 1, the voltage regulator 106 of FIGS. 1 and 7, one or more other devices, circuits, modules, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for scaling voltages provided to different modules of a system-on-chip (SOC), the method comprising:
   receiving, at a processor of the SOC, a first indication of usage history for a first module coupled to the processor and a second indication of usage history for a second module coupled to the processor, the usage history for the first module indicating how frequently the first module is used and the usage history for the second module indicating how frequently the second module is used;

receiving a battery life indication that indicates a remaining battery life for a battery coupled to the processor;

adjusting a first supply voltage provided to the first module based on the first indication, the second indication, and the battery life indication; and adjusting a second supply voltage provided to the second module based on the first indication, the second indication, and the battery life indication.

2. The method of claim 1, further comprising determining whether the remaining battery life is below a threshold, wherein the first supply voltage and the second supply voltage are adjusted in response to a determination that the remaining battery life is below the threshold.

3. The method of claim 1, wherein adjusting the first supply voltage comprises:

lowering the first supply voltage if the first indication and the second indication indicate that the first module has a lower power draw than the second module, wherein the power draw is based on a use of operation and a historical frequency of use; and raising the first supply voltage if the first indication and the second indication indicate that the first module has a higher power draw than the second module.

4. The method of claim 1, wherein adjusting the second supply voltage comprises:

lowering the second supply voltage if the first indication and the second indication indicate that the second module has a lower power draw than the first module; and raising the second supply voltage if the first indication and the second indication indicate that the second module has a higher power draw than the first module.

5. The method of claim 1, wherein adjusting the first supply voltage comprises commanding a voltage regulator to adjust the first supply voltage, and wherein adjusting the second supply voltage comprises commanding the voltage regulator to adjust the second supply voltage.

6. The method of claim 1, further comprising:

receiving a third indication of usage history for a third module coupled to the processor, the usage history for the third module indicating how frequently the third module is used; and adjusting a third supply voltage provided to the third module based on the first indication, the second indication, and the third indication.

7. The method of claim 6, wherein the first module includes a central processing unit, wherein the second module includes a graphics processing unit, and wherein the third module includes a digital signal processor.

8. The method of claim 1, wherein adjustments to the first supply voltage are further based on transistor characteristics of the first module.

9. The method of claim 8, wherein the transistor characteristics include transistor threshold voltages, transistor channel lengths, or any combination thereof.

10. The method of claim 8, wherein the transistor characteristics are determined based on a user profile, the user profile indicating a primary use for the SOC.

11. An apparatus comprising:

a processor of a system-on-chip (SOC); and a memory storing instructions executable by the processor to perform operations comprising:

receiving a first indication of usage history for a first module coupled to the processor and a second indication of usage history for a second module coupled to the processor, the usage history for the first module indicating how frequently the first module is used and the usage history for the second module indicating how frequently the second module is used;

receiving a battery life indication that indicates a remaining battery life for a battery coupled to the processor;

adjusting a first supply voltage provided to the first module of the SOC based on the first indication, the second indication, and the battery life indication; and adjusting a second supply voltage provided to the second module based on the first indication, the second indication, and the battery life indication.

12. The apparatus of claim 11, wherein the operations further comprise determining whether the remaining battery life is below a threshold, wherein the first supply voltage and the second supply voltage are adjusted in response to a determination that the remaining battery life is below the threshold.

13. The apparatus of claim 11, wherein adjusting the first supply voltage comprises:

lowering the first supply voltage if the first indication and the second indication indicate that the first module has a lower power draw than the second module, wherein the power draw is based on a use of operation and a historical frequency of use; and raising the first supply voltage if the first indication and the second indication indicate that the first module has a higher power draw than the second module.

14. The apparatus of claim 11, wherein adjusting the second supply voltage comprises:

lowering the second supply voltage if the first indication and the second indication indicate that the second module has a lower power draw than the first module; and raising the second supply voltage if the first indication and the second indication indicate that the second module has a higher power draw than the first module.

15. The apparatus of claim 11, wherein adjusting the first supply voltage comprises commanding a voltage regulator to adjust the first supply voltage, and wherein adjusting the second supply voltage comprises commanding the voltage regulator to adjust the second supply voltage.

16. The apparatus of claim 11, wherein the operations further comprise:

receiving a third indication of usage history for a third module coupled to the processor, the usage history for the third module indicating how frequently the third module is used; and adjusting a third supply voltage provided to the third module based on the first indication, the second indication, and the third indication.

17. The apparatus of claim 16, wherein the first module includes a central processing unit, wherein the second module includes a graphics processing unit, and wherein the third module includes a digital signal processor.

18. The apparatus of claim 11, wherein adjustments to the first supply voltage are further based on transistor characteristics of the first module.

19. The apparatus of claim 18, wherein the transistor characteristics include transistor threshold voltages, transistor channel lengths, or any combination thereof.

20. The apparatus of claim 18, wherein the transistor characteristics are determined based on a user profile, the user profile indicating a primary use for the SOC.

21. A non-transitory computer-readable medium comprising instructions for scaling voltages provided to different modules of a system-on-chip (SOC), the instructions, when executed by a processor of the SOC, cause the processor to:
receive a first indication of usage history for a first module coupled to the processor and a second indication of usage history for a second module coupled to the processor, the usage history for the first module indicating how frequently the first module is used and the usage history for the second module indicating how frequently the second module is used;
receive a battery life indication that indicates a remaining battery life for a battery coupled to the processor;
adjust a first supply voltage provided to the first module based on the first indication, the second indication, and the battery life indication; and
adjust a second supply voltage provided to the second module based on the first indication, the second indication, and the battery life indication.

22. The non-transitory computer-readable medium of claim 21, further comprising instructions that, when executed by the processor, cause the processor to determine whether the remaining battery life is below a threshold, wherein the first supply voltage and the second supply voltage are adjusted in response to a determination that the remaining battery life is below the threshold.

23. The non-transitory computer-readable medium of claim 21, wherein adjusting the first supply voltage comprises:
lowering the first supply voltage if the first indication and the second indication indicate that the first module has historically been used less frequently than the second module; and
raising the first supply voltage if the first indication and the second indication indicate that the first module has historically been used more frequently than the second module.

24. The non-transitory computer-readable medium of claim 21, wherein adjusting the second supply voltage comprises:
lowering the second supply voltage if the first indication and the second indication indicate that the second module has historically been used less frequently than the first module; and
raising the second supply voltage if the first indication and the second indication indicate that the second module has historically been used more frequently than the first module.

25. The non-transitory computer-readable medium of claim 21, wherein adjusting the first supply voltage comprises commanding a voltage regulator to adjust the first supply voltage, and wherein adjusting the second supply voltage comprises commanding the voltage regulator to adjust the second supply voltage.

26. The non-transitory computer-readable medium of claim 21, further comprising instructions that, when executed by the processor, cause the processor to:
receive a third indication of usage history for a third module coupled to the processor, the usage history for the third module indicating how frequently the third module is used; and
adjust a third supply voltage provided to the third module based on the first indication, the second indication, and the third indication.

27. The non-transitory computer-readable medium of claim 26, wherein the first module includes a central processing unit, wherein the second module includes a graphics processing unit, and wherein the third module includes a digital signal processor.

28. The non-transitory computer-readable medium of claim 21, wherein adjustments to the first supply voltage are further based on transistor characteristics of the first module.

29. An apparatus comprising:
means for generating a first indication of usage history for a first module of a system-on-chip (SOC) and a second indication of usage history for a second module of the SOC, the usage history for the first module indicating how frequently the first module is used and the usage history for the second module indicating how frequently the second module is used;
means for generating a battery life indication that indicates a remaining battery life for a battery of the SOC; and
means for adjusting a first supply voltage and a second supply voltage, wherein the first supply voltage is provided to the first module of the SOC based on the first indication, the second indication, and the battery life indication, and wherein the second supply voltage is provided to the second module of the SOC based on the first indication, the second indication, and the battery life indication.

30. The apparatus of claim 29, wherein adjusting the first supply voltage comprises:
lowering the first supply voltage if the first indication and the second indication indicate that the first module has historically been used less frequently than the second module; and
raising the first supply voltage if the first indication and the second indication indicate that the first module has historically been used more frequently than the second module.

* * * * *